United States Patent [19]
Kochi et al.

[11] Patent Number: 6,005,974
[45] Date of Patent: *Dec. 21, 1999

[54] APPARATUS FOR EXTRACTING FEATURE INFORMATION FROM IMAGES OF AN OBJECT HAVING DIFFERENT FOCUS CONDITIONS

[75] Inventors: Nobuo Kochi; Shin-ichi Nakamura; Hitoshi Otani; Takayuki Noma, all of Tokyo, Japan

[73] Assignee: Topcon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/530,572

[22] Filed: Sep. 19, 1995

[30] Foreign Application Priority Data

Sep. 19, 1994 [JP] Japan ................................. 6-249963

[51] Int. Cl.$^6$ ........................................................ G06K 9/46
[52] U.S. Cl. ............................................ 382/190; 382/199
[58] Field of Search ................................. 382/190, 106, 382/199, 195, 255; 364/561; 348/350; 702/158

[56] References Cited

U.S. PATENT DOCUMENTS

| | | | |
|---|---|---|---|
| 4,123,778 | 10/1978 | Graf et al. | 358/107 |
| 4,644,148 | 2/1987 | Kusaka et al. | 250/201 |
| 5,576,975 | 11/1996 | Sasaki et al. | 382/106 |
| 5,629,735 | 5/1997 | Kaneda et al. | 348/350 |

FOREIGN PATENT DOCUMENTS 58-208875  12/1983  Japan ............................. G06K 9/46

*Primary Examiner*—Andrew W. Johns
*Attorney, Agent, or Firm*—Foley & Lardner

[57] ABSTRACT

An apparatus is provided for extracting feature information from images of an object. The images of the object include a first in-focus image and a second soft focus image. The apparatus includes an optical system that includes at least one common image forming optical element. The optical system forms the first image and the second image of the object in different focus conditions. A photosensitive sensor converts the first image and the second image formed by the optical system to first and second image signals. An extracting feature device extracts the feature information of the object from a difference between the first image signals and the second image signals.

26 Claims, 14 Drawing Sheets

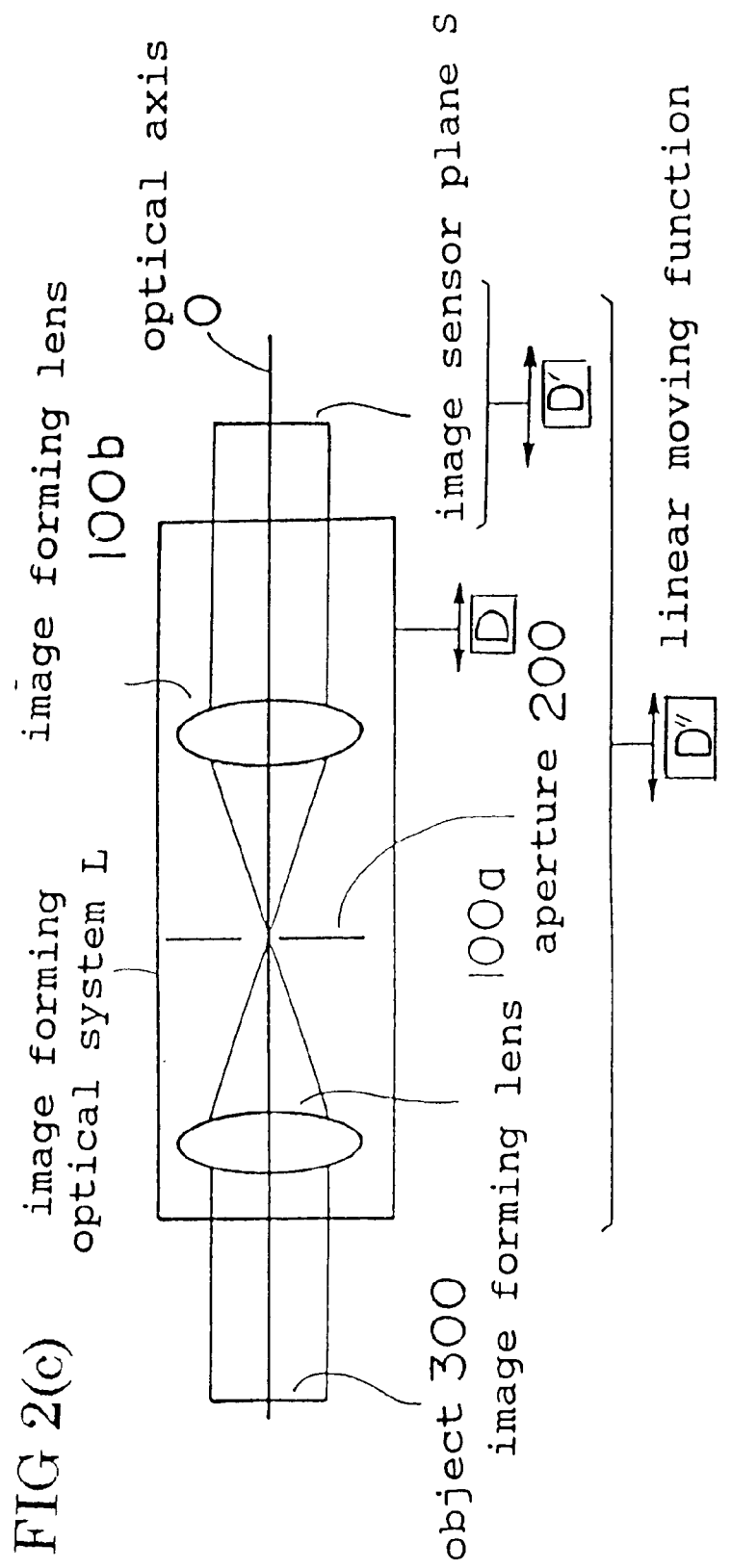

soft focus in-focus zero cross point
(correspond to edge of image)

zero cross point

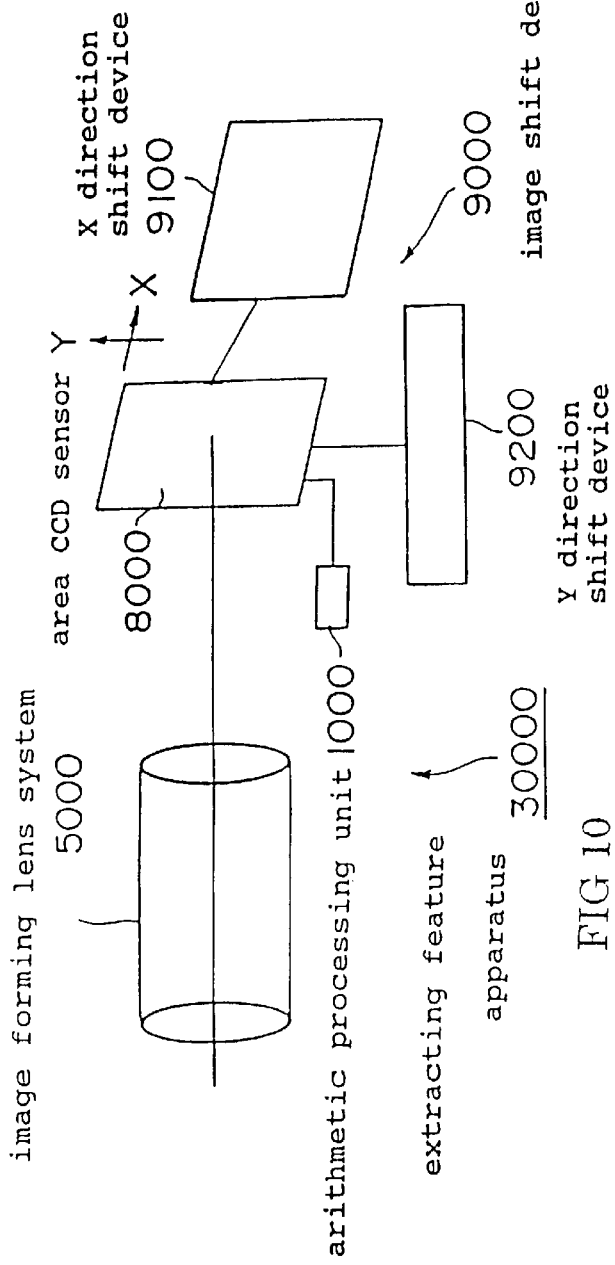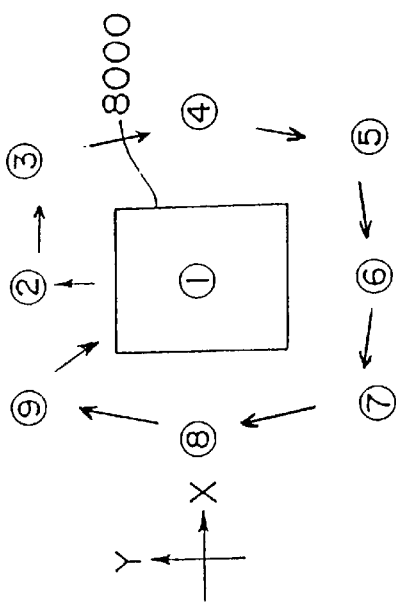

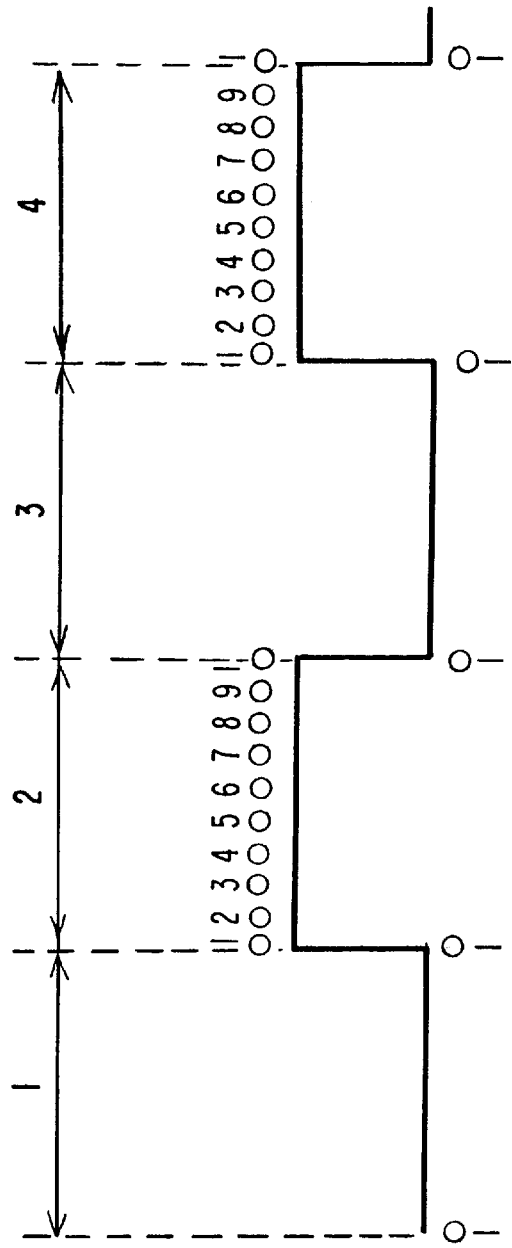
FIG 11(a) CCD accumulation cycle
FIG 11(b) soft focus (moving)
FIG 11(c) in-focus (not moving)

APPARATUS FOR EXTRACTING FEATURE INFORMATION FROM IMAGES OF AN OBJECT HAVING DIFFERENT FOCUS CONDITIONS

BACKGROUND OF THE INVENTION

1. Field of the Invention

The present invention relates to an apparatus for extracting a feature from images using a first image and a second image of an object.

More specifically the invention uses a first signal of the first image which is in relatively sharp focus and a second signal of the second image which is in relatively soft focus in order to extract a feature from the images.

2. Background Information

A feature extracting apparatus is commonly used with a system which stores data of an input image from a TV camera, and then extracts a feature of an object from the stored data using a two dimensional filtering processing. The two dimensional filtering process uses spatial filtering with Fourier transforms.

However, the foregoing two dimensional processing requires a lot of processing time. Faster processing can only be achieved using much larger memory capacity and faster, more expensive hardware.

An apparatus described in Japanese Non-examined Patent Publication No. 58-208875, takes an image of the object with two TV cameras, and stores data of the image. One image is in exact sharp focus, and the other image is out of focus. The apparatus then extracts edge information of the object using a differential operation of the image data taken by the two TV cameras.

However, if the view of one of the pair of video cameras is obstructed ("occluded"), it is impossible to extract edge or profile information of the object with the differential operation which relies on parallax to produce two images. Moreover, using two cameras introduce other inaccuracies in that the two cameras have slightly different characteristics both in their optics and electronics and in downstream processing circuits.

In the foregoing, if one camera is used to get two images of the object, the problem of parallax and possible image obstruction as well as different characteristics between the cameras is solved. But there are still problems in precise extracting of feature information because of changing a position of the principal point and varying the magnification with changing focal position.

SUMMARY OF THE INVENTION

An object of the present invention is to provide an apparatus for extracting a feature from images of an object without problems of image obstruction (occlusion) inherent in two camera systems.

Another object of the present invention is to provide an extracting feature apparatus and method using a first, relatively sharp image and a second, less sharp image of the object in a parallax-free imaging system.

A further object of the present invention is to provide apparatus for extracting a feature from images of the object quickly without using large amounts of memory and expensive, fast hardware.

A further object of the present invention is to provide an apparatus for extracting features from images quickly with a smaller amount of memory and simple hardware.

According to a first aspect of the invention, an apparatus is provided for extracting features from images of an object. The apparatus uses a parallax-free optical system, a photosensitive sensor and an extracting feature device. The optical system includes an image forming optical element, which forms both a first image and a second image of the object in a different focus condition. The photosensitive sensor converts the first image and the second image formed by the optical system into first image signals and second image signals. The extracting feature portion extracts the features of the object from a difference between the first image signals and the second image signals.

The above and further objects and novel feature of the invention will more fully appear from the following detailed description when the same is read in connection with the accompanying drawings.

It is to be expressly understood, however, that the drawings are for purpose of illustration only and are not intended to limit the invention.

BRIEF DESCRIPTION OF THE DRAWINGS

FIG. 2(c) shows an image forming optical system which is telecentric in an object and image area in the first embodiment of the invention.

FIG. 9 shows an overall layout of an extracting feature apparatus in accordance with a third embodiment of the invention.

FIG. 10 shows an image shifting device in the third embodiment of the invention.

FIG. 11 shows a relationship between the accumulation time of a CCD sensor for the in-focus and soft focus images.

DETAILED DESCRIPTION OF THE PREFERRED EMBODIMENTS

Generally speaking, the fewer high spatial frequency components an object has, the more inconspicuous the image of a profile of an object will be.

If the Fourier transform is performed on an image of an object, then the high frequency components of the image data may be increased by subsequently performing an inverse Fourier transform. The resulting image has a much clearer profile.

Figure 16:
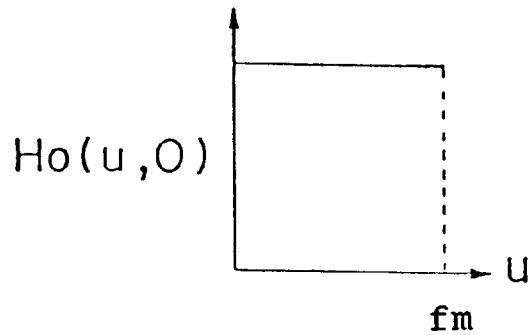
FIG. 16 shows a spatial frequency character graph when an image forming optical system forms an in-focus image.
Figure 17:
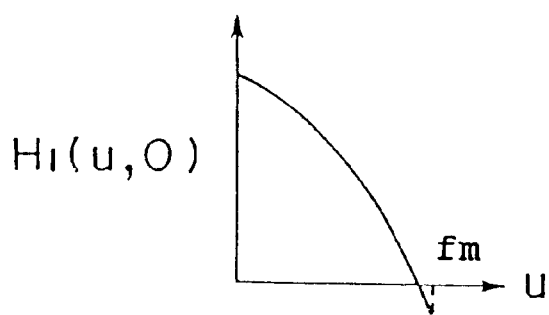
FIG. 17 shows a spatial frequency character graph when an image forming optical system forms a soft focus image.

In FIG. 16, there is shown a spatial frequency character graph at spatial frequency $H0(u,0)$ when an image forming optical system forms an in-focus image (sharp image). In FIG. 17, there is shown a spatial frequency character graph at spatial frequency $H1(u,0)$ when an image forming optical system forms a soft focus image (out of sharp focus).

An in-focus image means that the image is in sharp focus. A soft focus image includes an out of focus image, diffused image and an image which is shifted in position relative to a sharp image position.

Figure 18:
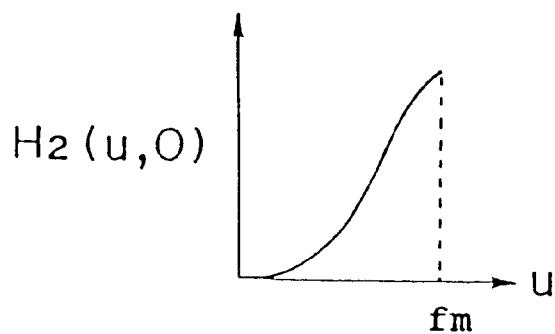
FIG. 18 shows a difference between the spatial frequency character of a sharp focus and soft focus image.

The difference between the spatial frequency character of the in-focus image and the spatial frequency character of the soft focus image is $H2(u,v)$ and is shown in FIG. 18 where "u" is a horizontal coordinate of the spatial frequency, and "v" is a vertical coordinate of the spatial frequency. For simplicity of illustration, the graphs of FIGS. 16–18 are sectional views (v=0) on the u axis of a spatial frequency character of an image on the x axis. FIGS. 16–18 show only the area where "u≧0", but these spatial frequency curves are rotationally symmetric about the origin (u=v=0). In FIGS. 16–18, point "fm" is the maximum spatial frequency which is equal to the inverse of the number of pixels.

Suppose an image is represented by the function $f(u,v)$ when the image is in-focus and the resulting Fourier transform image is $F(u,v)$. The Fourier transform image after passing through the image forming optical system is represented by $G(u,v)$. Then, $G(u,v)=F(u,v)H(u,v)$ where $H(u,v)$ is the transfer function in ideal conditions.

Further, one can define $G0(u,v)$ to be the Fourier transform image through the image forming optical system with an in-focus image, and $G1(u,v)$ to be the Fourier transform image through the image forming optical system with a soft focus image.

$G0(u,V)=F(u,v)H0(u,v)$ (in-focus)

$G1(u,v)=F(u,v)H1(u,v)$ (soft focus)

where,

H0 corresponds to a neutral filter (doesn't change the frequency components) and H1 corresponds to a low pass filter (high frequency cut off).

Then the Fourier transferred image $G2(u,v)$ is the difference between the Fourier transformed image through the image forming optical system with the in-focus image and the Fourier transform image through the image forming optical system with the soft focus image.

$G2(u,v)=F(u,v)H2(u,v)$
$=F(u,v)\{H0(u,v)-H1(u,v)\}$
$=F(u,v)H0(u,v)-F(u,v)H1(u,v)$

The transfer function $H2(u,v)$ has a low frequency cut function effecting a decrease (blocking) in low frequency components of the light.

A profile extracting image $g2(x,y)$ is a reproduced image which is reproduced by the inverse Fourier transform operating on the Fourier transformed image $G2(u,v)$.

$g2(x,y)=g0(x,y)-g0(x,y)$ where, $g0(x,y)$ is the in-focus image (the inverse transform of $G0(u,v)$), and $g1(x,y)$ is the soft focus image (the inverse transform of $G1(u,v)$).

In accordance with the principles of the invention, an in-focus image and a soft focus image are used wherein it is possible to extract feature information by subtraction of the images without using the Fourier transform and two dimensional spatial filtering.

Figure 1:
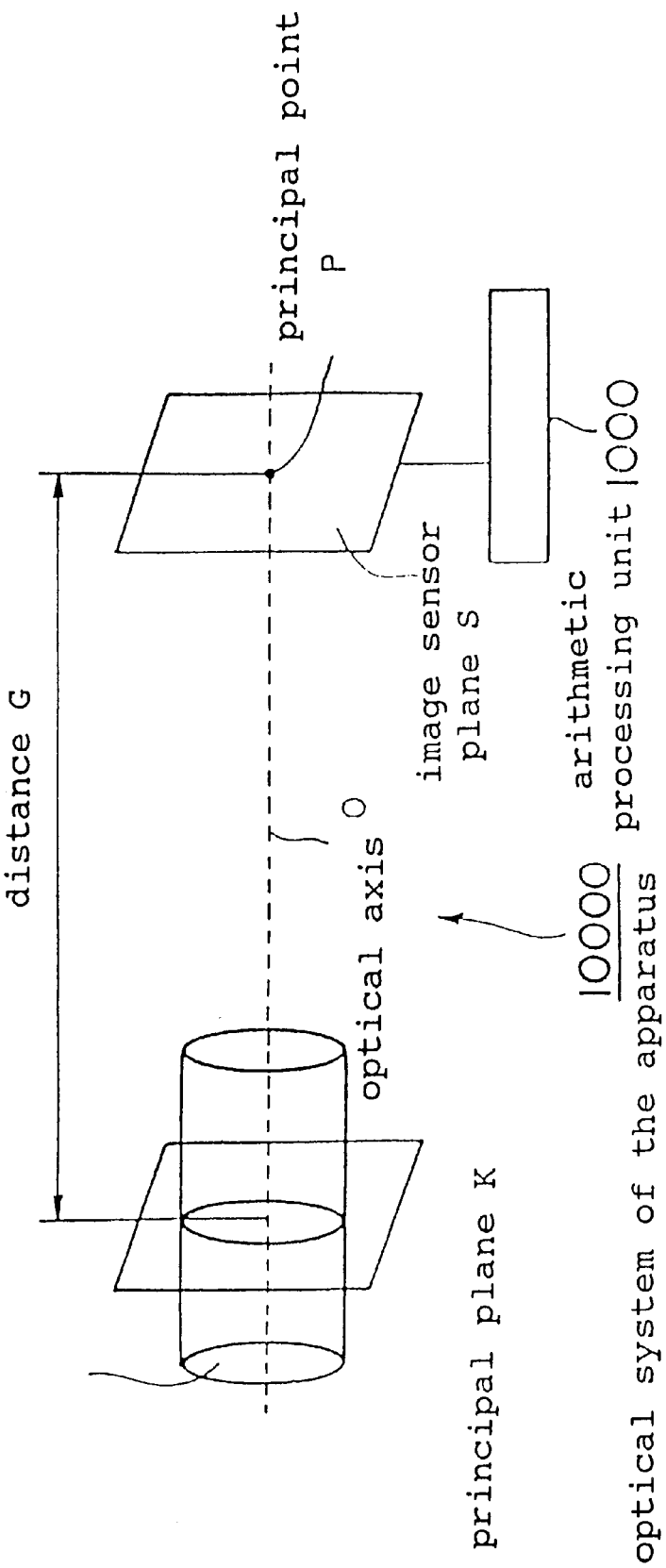
FIG. 1 shows an overall layout of an extracting feature apparatus in accordance with a first embodiment of the invention.

FIG. 1 shows a first embodiment of the invention which is seen to comprise an apparatus 10000 for extracting a feature from an image, and includes an optical system. The optical system of the extracting feature apparatus 10000 includes an image forming optical system L, an image sensor plane S (where a sensor is positioned), which is separated from a principal plane K of the image forming optical system L by distance G and is connected to an arithmetic processing unit 1000.

The optical system of the extracting feature apparatus 10000 includes a device D (i.e., linear motor) for providing a linear moving function which moves either the image sensor plane S by a linear distance or moves an element of the image forming optical system by a linear distance along the axis of the optical system.

This linear moving device D is operatively connected to the elements being moved such as to maintain the moved element perpendicular to the non-moved elements. As such, the position of principal point, P, remains unchanged, where P is defined as the crossing point between an optical axis O of the optical system L and the image sensor plane S.

Figure 2A:
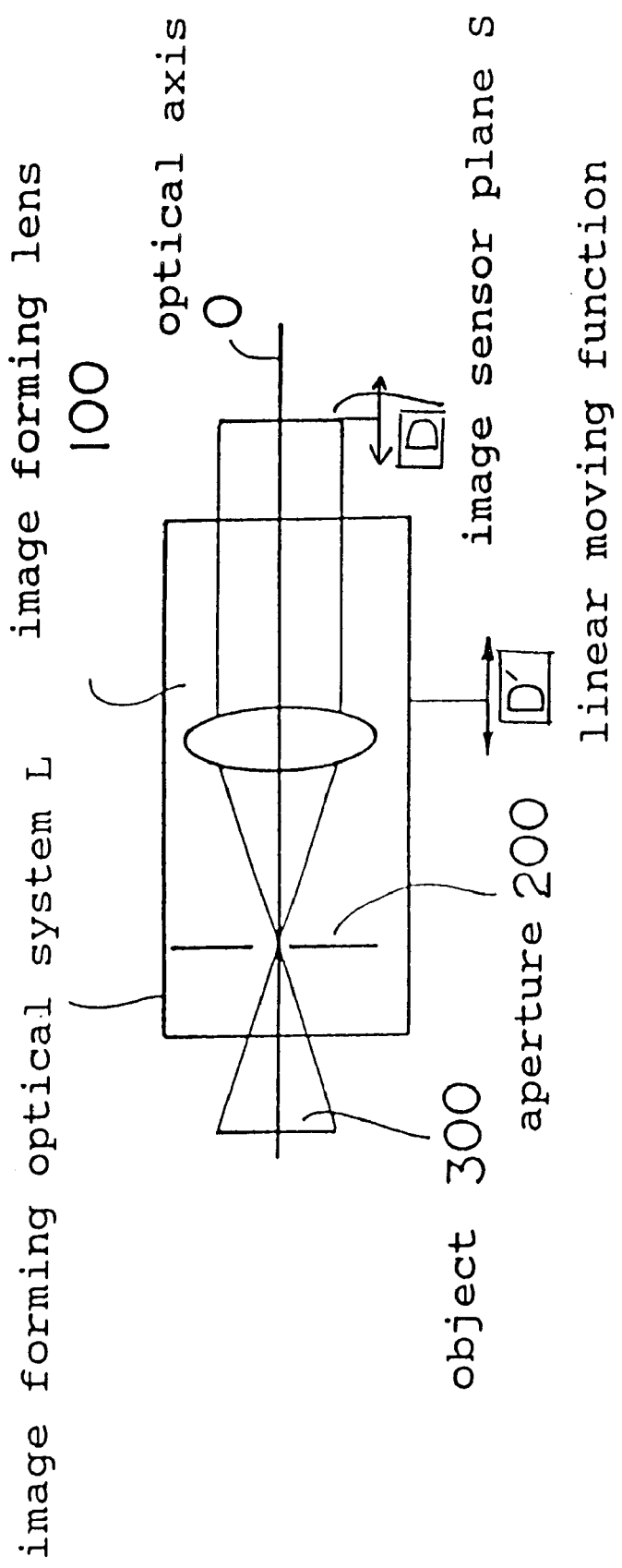
FIG. 2(a) shows an image forming optical system which is telecentric in an image area in the first embodiment of the invention.
Figure 2B:
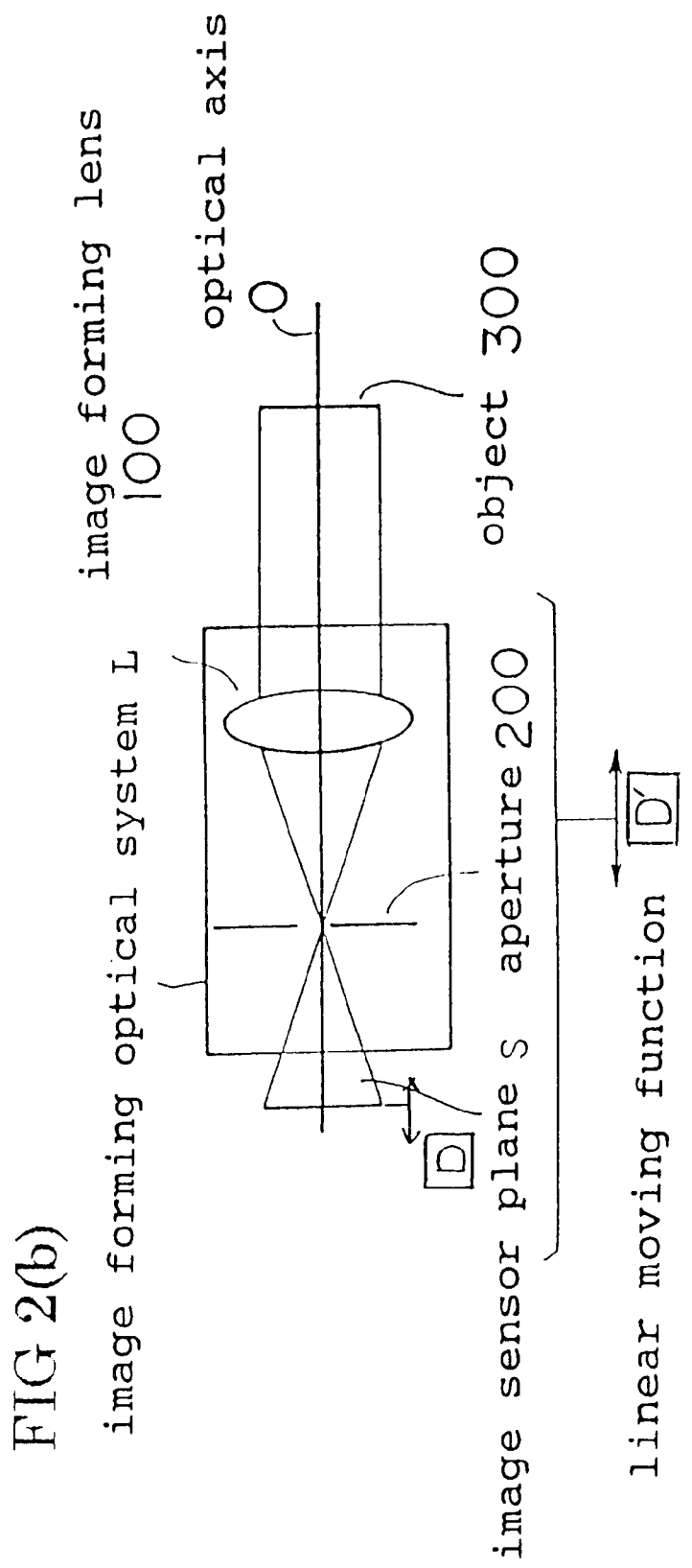
FIG. 2(b) shows an image forming optical system which is telecentric in an object area in the first embodiment of the invention.

Thus when moving, for example, an element of the optical system L in order to adjust the focus, the linear moving device D maintains the optical system L perpendicular with respect to the image sensor plane S as seen in FIGS. 2(*a*)–2(*c*).

The linear moving device D includes a linear guide as a base, and a stage portion connected so as to be slidable against the linear guide. The image forming optical system L is mounted to the stage portion.

The linear moving device D may be implemented in numerous ways so as to linerally move the elements of the optical system L or the image sensor plane S along the optical axis as will be apparent to those of skill in the art.

The following detail description deals with the optical system L.

FIGS. 2(*a*)–2(*c*) illustrate a first embodiment of an extracting feature apparatus 10000. In the first embodiment, the image forming optical system L is provided with an image forming lens 100 and an aperture 200, which comprise a telecentric optical system. As the aperture 200 is located at a focal point of the image forming lens 100, if the image sensor plane S or the elements of the image forming optical system move along the optical axis, the magnification of the image forming optical system L remains constant.

The aperture 200 corresponds to a telecentric aperture. An image of an object 300 is formed on the image sensor plane S through the image forming optical system L.

Referring to FIG. 2(*a*), the linear moving devices D and D' respectively move only the image sensor plane S, or the image forming lens 100 and the aperture 200 as a unit. The latter case is appropriate in a case where the distance to the object is far.

In FIG. 2(*a*) the image forming optical system is telecentric in the image area, and thus it is possible to change the focal position (the position of focus) and adjust a focus condition on the image sensor plane S without changing the magnification of the object image.

The image forming optical system of FIG. 2(*b*) oppositely arranges the object 300 and the image sensor plane S as compared to that of FIG. 2(*a*).

In FIG. 2(*b*) the image forming optical system is telecentric in the object area. The linear moving devices D and D' respectively move only the image sensor plane S, or the image forming lens 100 and the aperture 200 as a unit. Devices D, D and D' may be used separately or together to thereby adjust a focus condition (i.e., focus position) without changing the magnification of the image.

In the figures, those elements with common number identifiers are the same elements and explanation thereof is not repeated herein below.

In FIG. 2(*c*) the image forming optical system L comprises two image forming lens 100*a* and 100*b*, and the aperture 200 is located between the two lenses. In FIG. 2(*c*) the image forming optical system is telecentric in the object and the image area.

The back focal point of the image forming lens 100*a* coincides with the front focal point of the image forming lens 100*b*. The aperture 200 is located at the common is focal point.

The image forming optical system referred to in FIG. 2(*c*) forms an unmagnified (×1 magnification) image of an object 300. This image forming optical system referred to in FIG. 2(*c*) uses a linear device D and/or D' and or D" to move the image sensor plane S, or to move the image forming lenses 100*a* and 100*b* and the aperture 200 as a unit, or to move as a unit the image forming lenses 100*a* and 100*b*, the aperture 200 and the image forming sensor plane S. Devices D, D' and D" may be used separately or in any combination.

The image forming system of the first embodiment is thus able to form the image in-focus and out of focus on the image sensor plane S.

The above described image forming optical systems L are able to adjust the focal position without moving the principal point P of the optical system in the x,y plane (i.e., only movement along the optical axis).

As the in-focus image and the soft focus image are obtained by a common optical system and a common image signal processing system, the inventive system extracts features, edges and profiles in a precise manner.

The following is an explanation of the extracting processing procedures in accordance with the first embodiment of the invention.

Figure 3:
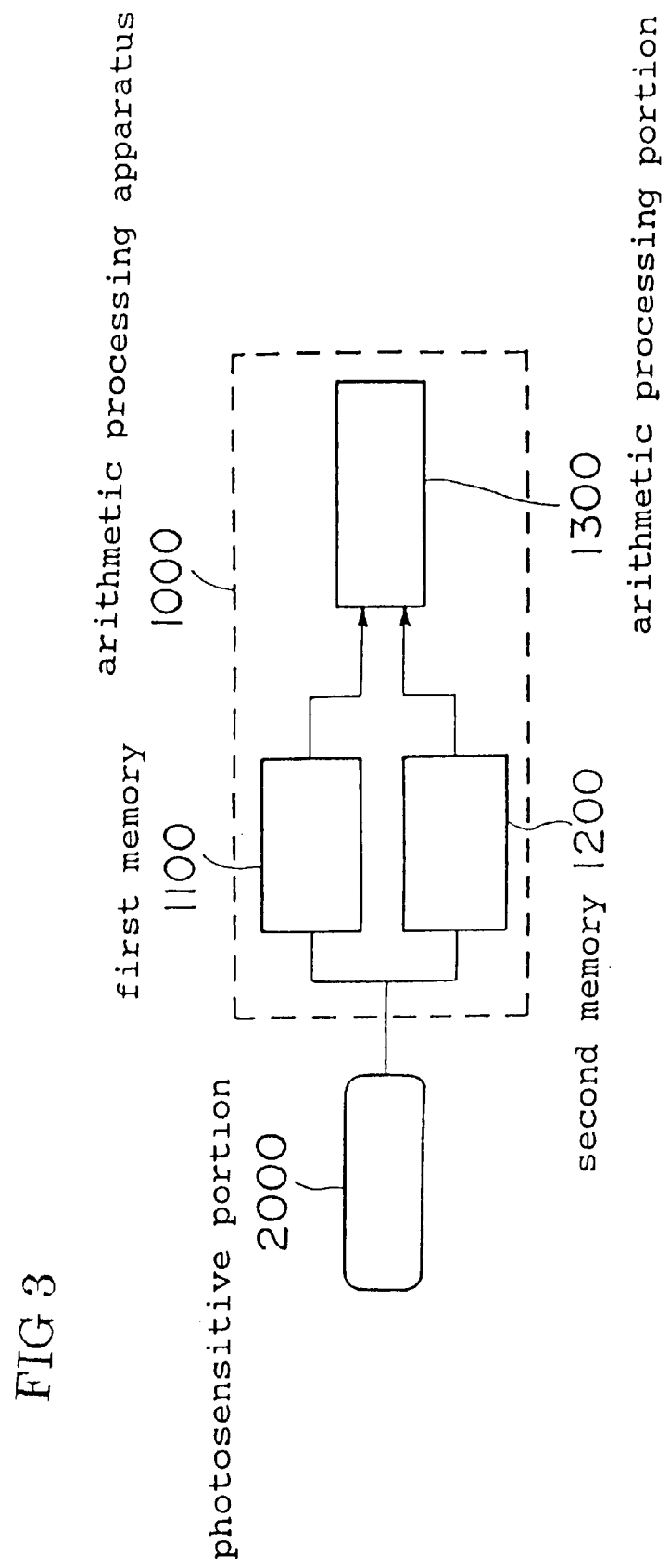
FIG. 3 shows a block diagram of an arithmetic processing system in the first embodiment of the invention.

Referring to FIG. 3, an arithmetic processing apparatus 1000 comprises a first memory 1100 and a second memory 1200, and an arithmetic processing portion 1300. The first memory 1100 stores first image signals which correspond to an in-focus image formed by the image forming optical system. A photosensitive portion 2000 is located on the image sensor plane S. The photosensitive portion 2000 converts the in-focus image to first image signals which are stored in the first memory 1100. The second memory 1200 stores second image signals which correspond to a soft focus image formed by the image forming optical system. The arithmetic processing portion 1300 subtracts the second image signals stored in the second memory 1200 from the first image signals stored in the first memory 1100.

The arithmetic processing apparatus 1000 corresponds to the extracting portion. The photosensitive portion 2000 may comprise a CCD camera, or other device, which provides an electrical signal or signals corresponding to the received image.

Figure 4:
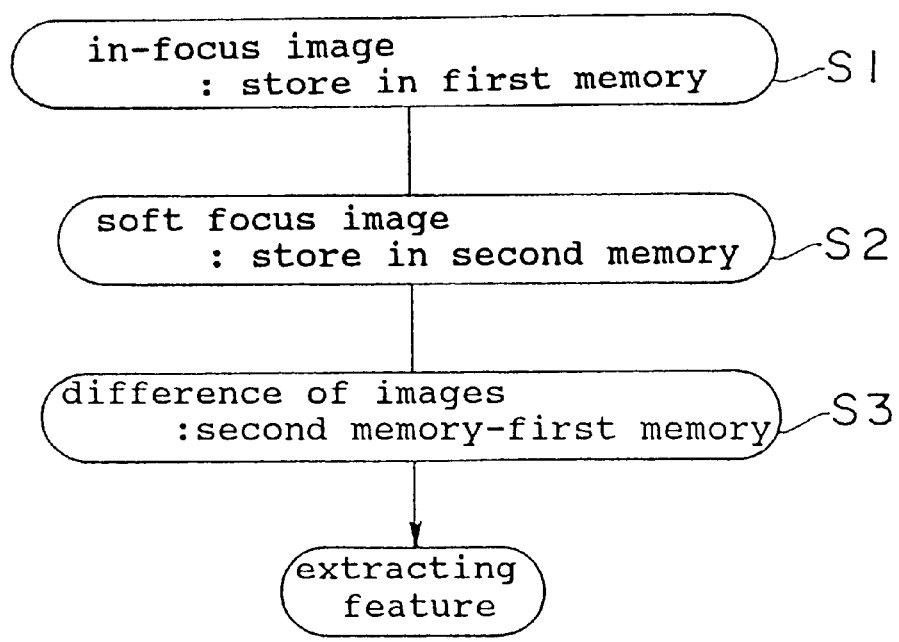
FIG. 4 shows an extracting process of an arithmetic processing apparatus in the first embodiment of the invention.

Referring to FIG. 4, the extracting process of the arithmetic processing apparatus is described as follows.

In step 1, the image forming optical system L forms the in-focus image of the object on the image sensor plane S. The photosensitive sensor portion 2000 converts the in-focus image to first image signals. Then the first memory 1100 stores the first image signals.

In step 2, the image forming optical system L forms the soft focus image of the object on the image sensor plane S. The photosensitive sensor portion 2000 converts the soft focus image to second image signals. Then the second memory 1200 stores the second image signals.

In step 3, the arithmetic processing portion 1300 subtracts the second image signals corresponding to the soft focus image from the first image signals corresponding to the in-focus image, and extracts the edges or profiles of the objects.

The following is an explanation of the apparatus for extracting features from images in accordance with a second embodiment of the invention.

Figure 5:
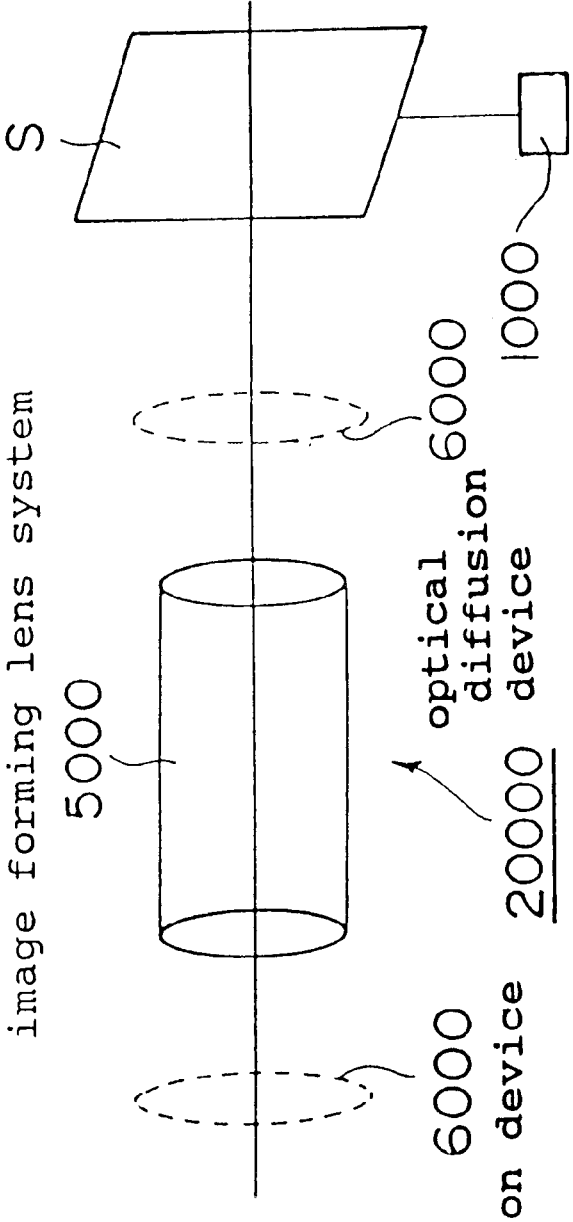
FIG. 5 shows an overall layout of an extracting feature apparatus in accordance with a second embodiment of the invention.

FIG. 5 shows an overall arrangement of the optical system of the second embodiment. In the second embodiment, the optical system of the apparatus for extracting features from images comprises an image forming lens system 5000, an image sensor plane S and an optical diffusion device 6000. Preferably the optical diffusion device comprise a foggy filter, but other optical devices may be used instead of or in addition to the foggy filter as long as a soft focus image is obtained.

The optical diffusion device 6000 may be located at a position in front of or behind the image forming lens system 5000, and it may be selectively inserted into or withdrawn from the optical path of the image forming system 5000. The in-focus image appears on the image sensor plane S when the optical diffusion device is withdrawn, and the soft focus image appears on the image sensor plane S when the optical diffusion device is inserted into the optical path.

In the second embodiment, the extracting feature process and the arithmetic processing apparatus are the same as that of the first embodiment.

Figure 6:
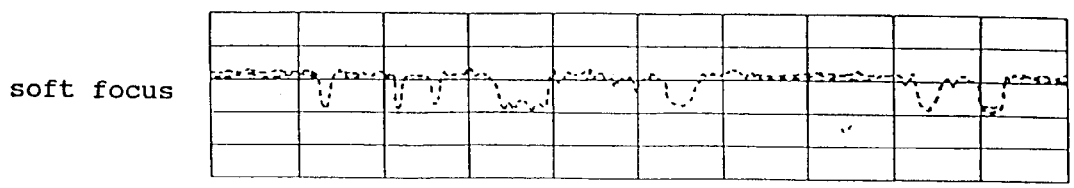
FIG. 6 is a graph showing the soft focus image when a diffusion optical device is inserted into the optical path.
Figure 7:
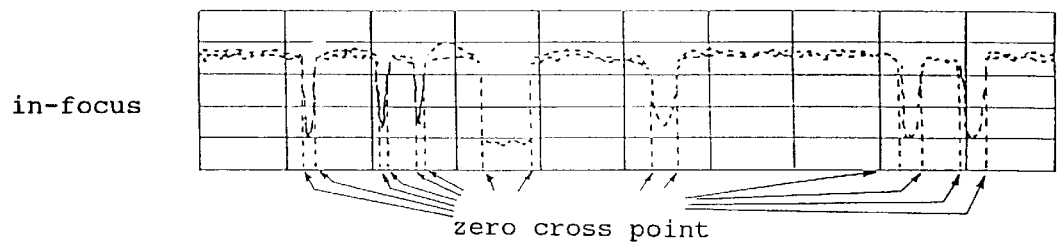
FIG. 7 is a graph showing the in-focus image and the result of the extracting feature processing.
Figure 8:
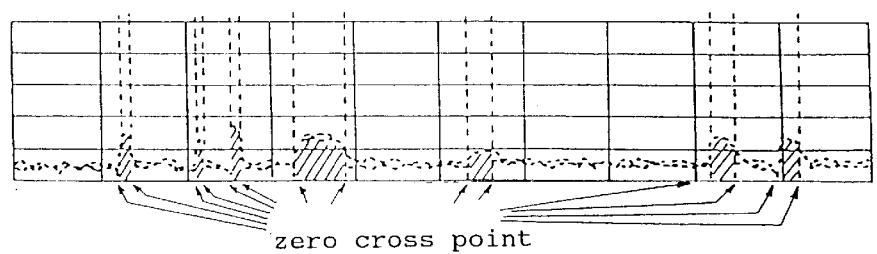
FIG. 8 is a graph showing the difference between the first image signals of the in-focus image and the second image signals of the soft focus image.

FIGS. 6–8 show graphs of the results of the extracting feature processing with an extracting feature apparatus 20000 of the second embodiment. In these graphs, for simplicity of illustration, the evaluation is based on an image formed on one horizontal line (i.e., a one dimensional image).

FIG. 6 shows the soft focus image when the optical diffusion device is inserted into the optical path.

FIG. 7 shows the in-focus image (diffusion device withdrawn) and the result of the extracting feature processing.

FIG. 8 shows the difference between the first image signals corresponding to the in-focus images and the second image signals corresponding to soft focus images. In FIG. 8, the zero line is the second lowest line, and the hatched portions indicate a minus (negative) area.

The differential result of FIG. 8, especially the zero crossing point, corresponds to an extracted edge or profile feature such as an edge.

In FIG. 7, longitudinal (vertical) lines are drawn at the zero cross points of the extracted profile image on the in-focus image. It is apparent that these lines correspond to edges of the image.

The third embodiment of the invention is now explained in reference to FIG. 9 which shows an overall arrangement of an extracting feature apparatus 30000.

In the third embodiment, the feature extracting apparatus comprises an image forming lens system 5000, image sensor plane S, an area CCD sensor 8000 located on the image sensor plane S, and an image shift device 9000. The image forming lens system 5000 comprises the image forming optical system. The area CCD, sensor 8000 comprises a photosensitive sensor which converts the image formed on the image sensor plane S into electronic image signals. The image shift portion 9000 is connected to the area CCD sensor 8000 to move sensor 8000 in the direction perpendicular to the optical axis, i.e., in the x,y plane.

The image shift device 9000 is seen to comprise an X direction shift device 9100 and a Y direction shift device 9200 fabricated from piezo-electric devices. However, the image shift device 9000 is not limited to piezo-electric devices but may include any device for moving the area CCD sensor in the x,y plane.

In the third embodiment, the extracting feature processing and the arithmetic processing apparatus are the same as that of the first embodiment.

The third embodiment is difference from the first embodiment in the means for switching the in-focus image and the soft focus image. In the third embodiment, the extracting feature apparatus forms the in-focus image on the image sensor plane S without driving the piezoelectric device.

The area CCD sensor 8000 converts the in-focus image to first image signals, and the first memory 1100 stores the first image signals (see FIG. 3).

The image shift device 9000 forms the in-focus image on the area CCD sensor 8000 at the center of the shifting range of the image shifting portion. Then the image shifting portion 9000 is activated and the area CCD sensor is shifted slightly in the x-y plane to accumulate a soft-focus image. Referring to FIG. 10, position (1) is the place when the image shift device 9000 is not activated (in-focus position). Positions (2) through (9), and back to position (1) represent the path moved by sensor 8000 via the image shift device 9000. The area CCD sensor 8000 accumulates data during CCD sensor 8000 movement through positions (2) through (9), and back to position (1). The accumulation time is the same as that during which the area CCD sensor 8000 accumulates the in-focus image at position (1).

FIG. 11 shows the relationship between the accumulation time of area CCD sensor 8000 in the in-focus and soft focus conditions for four cycles of image data collection. The small circled numbers correspond to the numbered positions of FIG. 10.

The second memory 1200 stores the second image signals from the area CCD sensor 8000 during the soft focus condition. The data of each one pixel is stored by the second memory 1200 and corresponds to a value which is integrated spatially among neighborhood pixels during movement of the CCD sensor. The integrated data corresponds to the soft focus image data.

In the third embodiment, the first memory 1100 stores the first signals corresponding to the in-focus image, and the second memory 1200 stores the second signals corresponding to the soft focus image.

Subsequent to image data collection, the arithmetic processing portion 1300 extracts the feature, profile and edges of the object by the subtracting processing.

In the third embodiment, the image shift device 9000 shifts the area CCD sensor 8000, but it is also possible instead or in addition for the image shift device to shift the image forming lens system 5000.

In the following fourth embodiment, the soft focus image is obtained by shifting the ray from to the object with the image shift device.

Figure 12:
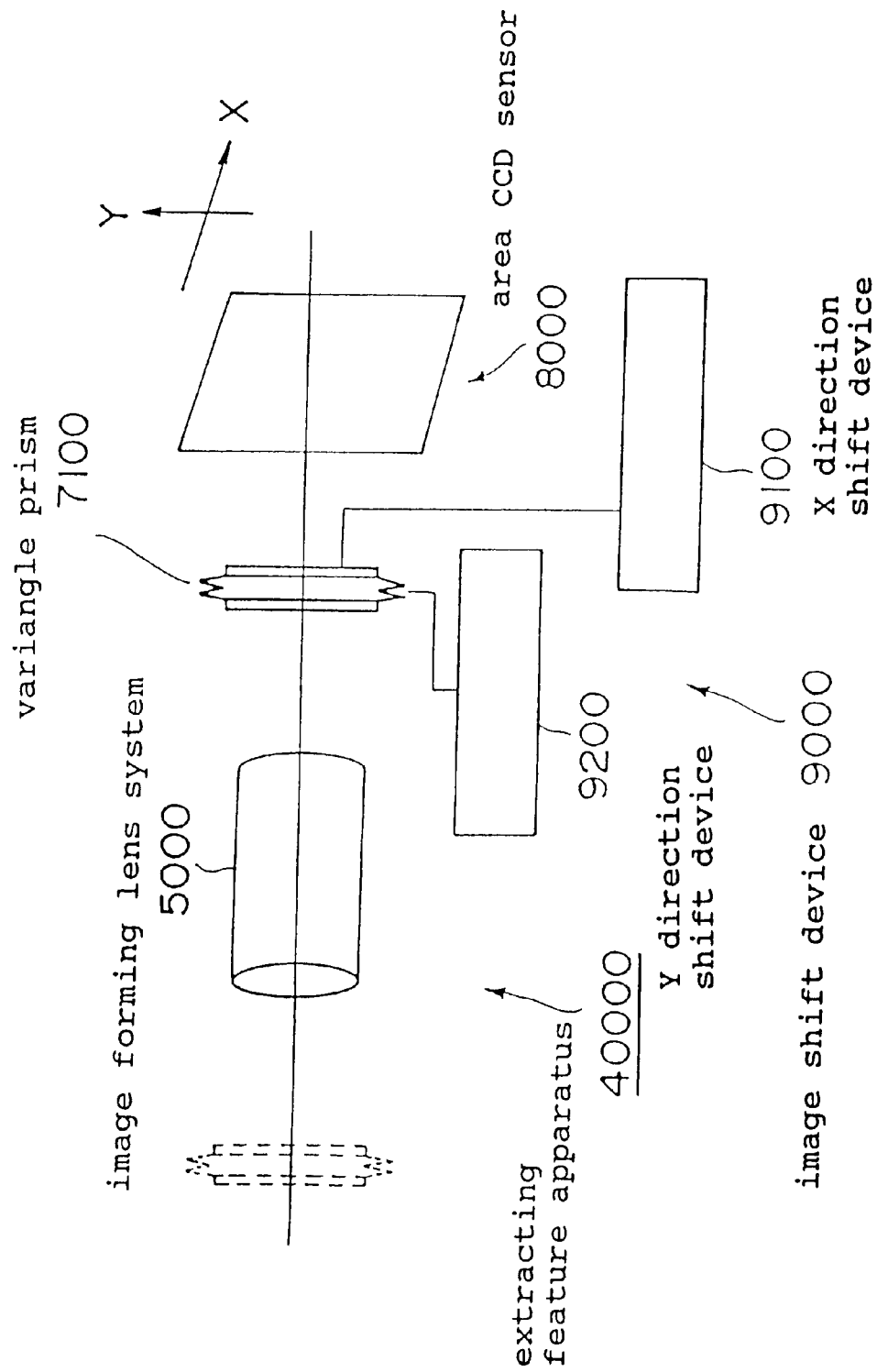
FIG. 12 shows an overall layout of an extracting feature apparatus in accordance with a fourth embodiment of the invention.

FIG. 12 shows the overall arrangement of the extracting feature apparatus 40000 including the optical system in accordance with the fourth embodiment of the invention. The extracting feature apparatus 40000 comprises an image shift device 9000 including a variangle prism 7100 and a prism drive actuator, an image forming lens system 5000 and the area CCD sensor 8000. The image position is changed by the variangle prism 7100 and thus the area CCD sensor 8000 can obtain a soft focus image.

Figure 14:
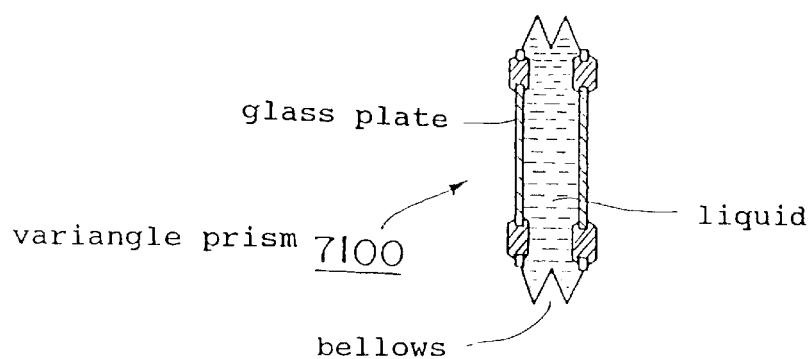
FIG. 14 shows a sectional view of the variangle prism.

FIG. 14 shows a cross sectional view of the variangle prism 7100. The variable prism 7100 comprises a pair of glass plates connected via bellows. The prism contains a transparent liquid, for example, cedar oil, water, etc.

Figure 13A:
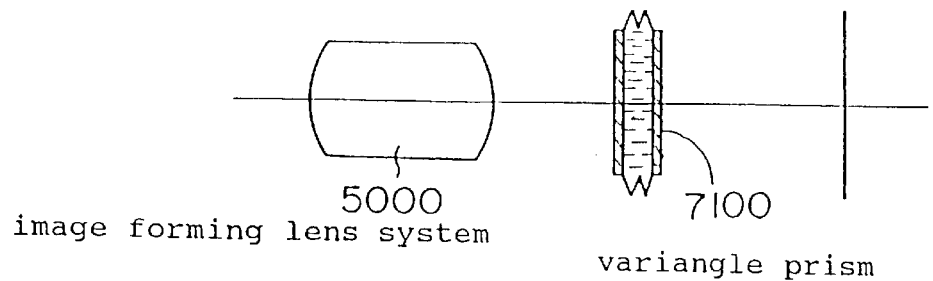
FIG. 13(a) shows a drawing when the in-focus image is formed on the image sensor plane S in the fourth embodiment of the invention.
Figure 13B:
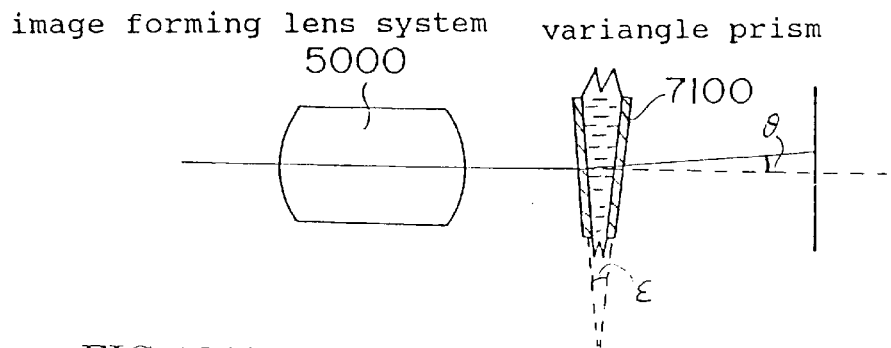
FIGS. 13(b) and 13(c), show a drawing when the soft focus image is formed on the image sensor plane S in the fourth embodiment.
Figure 13C:
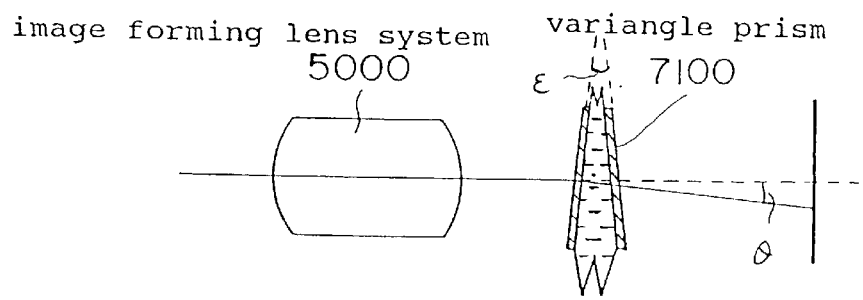

FIGS. 13(a)–(c) show the principle of moving the image on the image sensor plane S by shifting the ray from the object using the variangle prism 7100.

FIG. 13(a) shows how the in-focus image is formed on the image sensor plane S. In this case, the glass plates of the variangle prism 7100 are parallel and the prism angle of the variangle prism 7100 is 0°.

FIGS. 13(b) and 13(c) show how the soft focus image is formed on the image sensor plane S. In this case, the glass plates of the variangle prism 7100 act like a prism having a slight prism angle, because the glass plates are slightly inclined. One is able to control the angle θ by changing the prism angle ε of the variangle prism 7100 according to the following formula:

$$\theta = (n - E)$$

where, n is the index of refraction of the liquid, and

ε is the prism angle of the variangle prism 7100.

FIGS. 13(a)–(c) illustrate shifting the light ray in one direction, say the y direction, but it is understood that the orthoginal direction, the x direction, may also be shifted in a similar manner.

Referring to FIG. 12, the image shift device 9000 comprises the x and y prism driving actuators 9100 and 9200, respectively. These actuators determine the prism angle for providing the in-focus image and soft focus image on the image sensor plane S in a similar fashion as moving the area CCD 8000 through positions (1) (2) . . . (9) and (1) in the third embodiment.

The area CCD sensor 8000 generates the first signals corresponding to the in-focus image, and the second signals corresponding to the soft focus image just as in the third embodiment.

The extracting feature apparatus 40000 and the arithmetic processing apparatus of the fourth embodiment are the same as those of the first embodiment. In the extracting feature apparatus 40000 of the fourth embodiment, switching between the in-focus image and the soft focus image on the image sensor plane S is performed by the image shift device 9000 with the prism drive actuator.

The operation of the extracting feature apparatus in the fourth embodiment is as follows. Referring to FIG. 13(a), the prism angle of the variangle prism 7100 is initially 0° when the prism actuators (shift portions 9100 and 9200) are not operated. Then the in-focus image is formed on the image sensor plane S, namely on the area CCD sensor 8000 at the center thereof as seen by position (1) in FIG. 10. The area CCD sensor 8000 converts the in-focus image to first image signals. The first image signals are stored in the first memory 1100. Again referring to FIG. 10, the ray from the object is then shifted with the image shift device 9000 through positions (2) (3) ... (9) and back to position (1). The positions (2) (3) ... (9) and (1) define the path of movement of the image when the prism angle ε of the variangle prism 7100 is changed slightly. The area CCD sensor operates in an accumulating state during movement of the sensor in the directions (2) ... (9) and (1).

FIG. 11 again shows the relationship between the accumulating time of the area CCD sensor 8000 during in-focus and soft focus operation. The second memory 1200 stores the second image signals given by the area CCD sensor for the soft focus condition. The data of each one pixel stored by the second memory 1200 is the value which is integrated spatially among neighborhood pixels. This data corresponds to the soft focus image data.

In the fourth embodiment, the first memory 1100 stores the first signals corresponding to the in-focus image, and the second memory 1200 stores the second signals corresponding to the soft focus image.

Then the arithmetic processing portion 1300 extracts the edge (corresponding to a feature or profile) of the object by the subtracting processing as in the other embodiments.

In the fourth embodiment, the variangle prism 7100 is located between the image forming lens system 5000 and the area CCD sensor 8000, but it will be appreciated that the variangle prism 7100 may be located in front of the image forming lens system 5000.

Figure 15:
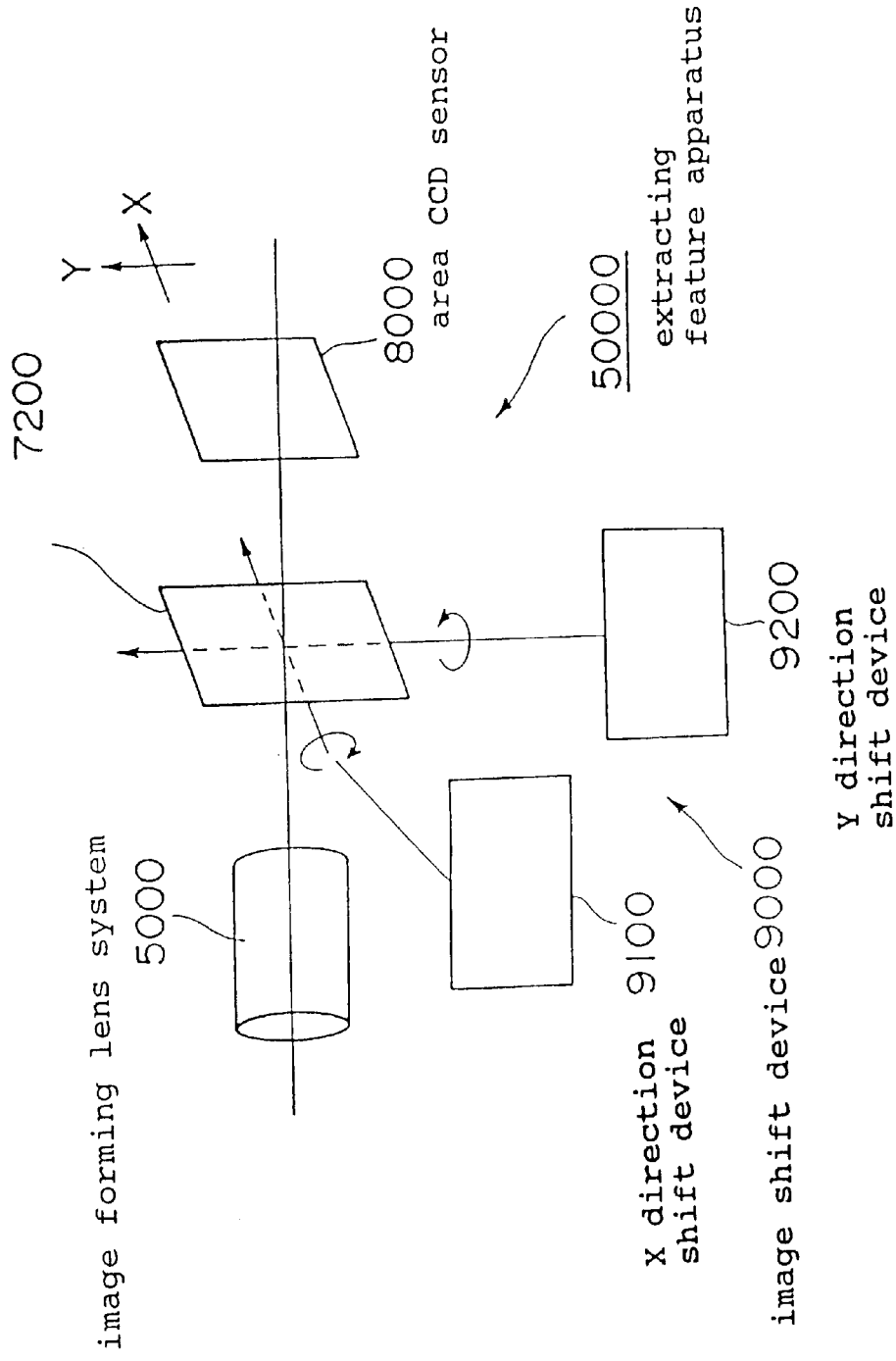
FIG. 15 shows an overall layout of an extracting feature apparatus for a fifth embodiment of the invention.

FIG. 15 shows the overall arrangement of the extracting feature apparatus 50000 including the optical system in accordance with the fifth embodiment of the invention.

In the fifth embodiment, the extracting feature apparatus 50000 comprises an image forming lens system 5000, a parallel plane 7200, an image shift device 9000 and an area CCD sensor 8000.

The image shift device 9000 comprises an X axis actuator and a Y axis actuator and the parallel plane 7200 instead of the variangle prism 7100 of the fourth embodiment. In the fifth embodiment, the area CCD sensor 8000 receives the in-focus image and the soft focus image by rotating the parallel plane around the X axis and the Y axis. Referring to FIGS. 10 and 11, rotating the parallel plane around the X axis and the Y axis shifts the image on the area CCD sensor 8000. In the fifth embodiment, the other elements and processing devices are the same as those of the fourth embodiment.

In the fifth embodiment, the parallel plane 7200 is located between the image forming lens system 5000 and the area CCD sensor 8000, but it will be appreciate that the parallel plane 7200 may be located in front of the image forming lens system 5000.

As the image forming optical system forms the in-focus image and the soft focus image on the same sensor, and the extracting feature portion subtracts the second image signals stored by the second memory 1200 from the first image signals stored by first memory 1100, the extracting feature apparatus can extract the feature from the image precisely and certainly. This is because of the common image forming optical system, common photosensitive sensor and the common extracting feature portion. Thus, one is able to solve the problem of parallax and differences of character between the cameras (in a two camera system).

The invention may also be practiced using two soft focus images instead of one in-focus and one soft focus image. In this alternative technique, a first soft focus image is more nearly in focus (but still slightly out of focus) than the second soft focus image. The first image then takes the place of the "in-focus" image in all of the preceding examples and embodiments of the invention, and the resulting differential (similar to FIG. 8) is still useful for extracting edge and feature information.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for extracting feature information of an object from images of said object, comprising:

a parallax-free optical system including at least one image forming optical element, for forming a first image of the object and a second image of the object without changing magnification of said images, wherein said second image is in a different focus condition from that of said first image, a photosensitive sensor for converting said first image and said second image into first image signals and second image signals, respectively, and an extracting feature device for extracting at least one of edges and a profile of said object as said feature information of said object based on at least one zero crossing point resulting from subtracting said second signals from said first signals, whereby said feature information is extracted from data representative of said first and second images, which are in different focus conditions.

2. The apparatus according to claim 1, wherein said optical system for forming the first and second images includes a device for moving at least on of (1) the at least one image forming optical element of said optical system and (2) said photosensitive sensor along an optical axis of said optical system.

3. The apparatus according to claim 2, wherein said at least one image forming optical element comprises a telecentric optical system including an image forming lens portion and a telecentric stop member, and said apparatus further comprises a distance changing device for changing the distance between at least one of (1) said object and said image forming lens portion and (2) between said image forming lens and said photosensitive sensor.

4. The apparatus according to claim 1, wherein said optical system for forming the first and second images includes a device for changing a distance between the at least one image forming optical element of said optical system and said photosensitive sensor.

5. The apparatus according to claim 4, wherein said at least one image forming optical element comprises a telecentric optical system including a image forming lens portion and a telecentric stop member, and said apparatus further comprising a distance changing device for changing the distance between at least one of (1) said object and said image forming lens portion and (2) between said image forming lens and said photosensitive sensor.

6. The apparatus according to claim 1, wherein said optical system further includes a diffusion device and means for selectively positioning said diffusion device in an optical path between said object and said photosensitive sensor, wherein said optical system forms a soft focus image as said second image on the photosensitive sensor when said diffusion device is positioned in the optical path, and forms an in-focus image as said first image on the photosensitive sensor when said diffusion device is not positioned in said optical path.

7. The apparatus according to claim 1 wherein said first image is an in-focus image and said second image is a soft focus image.

8. The apparatus according to claim 1 wherein said first image is a soft focus image and said second image is a soft focus image, said first image being more nearly in focus relative to said second image.

9. An apparatus for extracting feature information from images of an object, comprising:
   a single, parallax-free image forming optical system for forming at least one image of said object, said optical system forming a first image of said object and a second image of said object without changing magnification of the images, wherein said first image is sharper in focus than said second image,
   a photosensitive sensor for converting said first image and said second image into first and second image signals, respectively,
   an extracting device for extracting at least one of edges and a profile of said object as said feature information of said object based on at least one zero crossing point generated by subtracting said second image signals from said first image signals, whereby said feature information is extracted from data representative of said first and second images, which are in different focus conditions, and
   an image shift device which shifts the relationship between said at least one image of the object and said photosensitive sensor for producing said first and second images.

10. The apparatus according to claim 9, wherein said image shift device shifts said photosensitive sensor in a plane perpendicular to an optical axis of said optical system.

11. The apparatus according to claim 9, wherein said image shift device shifts said at least one image formed by said optical system relative to said photosensitive sensor, thereby forming said second image.

12. The apparatus according to claim 11, wherein said image shift device comprises a variangle prism.

13. The apparatus according to claim 11, wherein said image shift device comprises an element for rotating at least one of said optical system and said photosensitive sensor in a plane, said plane formed substantially perpendicular to an optical axis of said image forming optical system.

14. The apparatus according to claim 9, wherein said photosensitive sensor comprises a charge accumulation type photosensitive sensor for forming said first image signals when the image of said object is positioned near a center of a range of predetermined shifting positions, said positions determined with respect to an optical axis of said optical system, and for forming said second image signals when the image of said object is moved within said range during shifting by said image shift device.

15. The apparatus according to claim 9, wherein said extracting device extracts said feature information of said object based on (1) said first image signals, formed when the image of the object is located in the center of a range of predetermined shifting positions, said positions determined with respect to an optical axis of said optical system, and on (2) said second image signals, formed while the image of the object is located away from said center, but within said range.

16. A method for extracting feature information from images of an object, comprising:
    using a single, parallax-free optical system, forming a first image of said object and a second image of said object, said first and said second images having different focus conditions and having the same magnification,
    converting said first and said second images into corresponding eletronic first and second pluralities of data signals; and
    extracting at least one of edges and a profile of said object as said feature information of the object based on at least one zero crossing point by subtracting said second plurality of data signals from said first plurality of data signals, whereby said feature information is extracted from data representative of said first and second images, which are in different focus conditions.

17. The method of claim 16 wherein, said forming step includes shifting the position of said second image on a photosensitive receiving device relative to the position of said first image.

18. The method of claim 17, wherein said shifting step includes shifting the position of said second image in a continuous manner over a preset range of motion across said photosensitive receiving device and said method further comprises accumulating data for said second image during said continuous shifting.

19. The method of claim 16 further comprising:
    forming said first and second images on a detector,
    providing an optical imaging device between said object and said detector, and
    relatively moving at least one of said object, optical imaging device and said detector to form said first and second images.

20. An apparatus for extracting feature information of an object from images of said object, comprising:
    a parallax-free optical system including at least one image forming optical element for forming an in-focus image of said object and a soft focus image of said object without changing magnification of the images,
    a photosensitive sensor for converting said in-focus image and said soft focus image to first electrical signals and second electrical signals, respectively, and
    an extracting feature device for extracting at least one of edges and a profile of said object as said feature information of said object based on at least one zero crossing point resulting from subtracting said second signals from said first signals, whereby said feature information is extracted from data representative of said images, which are in different focus conditions.

21. A method for extracting feature information of an object from images of an object, comprising:
    using a parallax-free optical system, forming an in-focus image of said object and a soft focus image of said object without changing magnification of said images,
    converting said in-focus image and said soft focus image into corresponding electronic first and second pluralities of data signals by generating electrical signals with a photosensitive device; and
    extracting at least one of edges and a profile of said object as said feature information of said object based on at least one zero crossing point resulting from subtracting said second data signals from said first data signals, whereby said feature information is extracted from data representative of said images, which are in different focus conditions.

22. An apparatus for extracting feature information of an object from images of said object, comprising:

a telecentric optical system for forming at least a first image of the object and a second image of the object, including an image forming lens and an aperture located at a focal point of said image forming lens;

a sensor for converting said first image and said second image into first image signals and second image signals, respectively;

wherein at least one of said telecentric optical system and said sensor are moveable along an optical axis of said apparatus to generate said first and said second images in different focus conditions; and an extracting feature device for extracting at least one of edge information and profile information of said object as said feature information of said object by subtracting said second signals from said first signals, whereby said feature information is extracted from data representative of said first and second images, which are in different focus conditions.

23. An apparatus for extracting feature information of an object from images of said object according to claim 22, wherein said aperture is a telecentric aperture.

24. An apparatus for extracting feature information of an object from images of said object according to claim 23, wherein said a telecentric optical system comprises two image forming lenses and said telecentric aperture is located at a common focal plane of said lenses.

25. An apparatus for extracting feature information of an object from images of said object according to claim 22, wherein said a telecentric optical system comprises two image forming lenses and said aperture is located at a common focal plane of said lenses.

26. A method for extracting feature information from images of an object, comprising:

forming a first image of said object and a second image of said object using a telecentric optical system that includes an image forming lens and a telecentric aperture located at a focal point of said image forming lens, wherein said first image and said second image have different focus conditions, converting said first and said second images into corresponding electronic first and second pluralities of data signals; and extracting at least one of edge information and profile information of said object as said feature information of the object based on at least one zero crossing point by subtracting said second plurality of data signals from said first plurality of data signals, whereby said feature information is extracted from data representative of said first and second images, which are in different focus conditions.

* * * * *